United States Patent [19]

Hasegawa et al.

[11] 4,193,677
[45] Mar. 18, 1980

[54] WARNING CIRCUIT IN AN AUTO-CONTROLLED FLASHLIGHT PHOTOGRAPHING DEVICE

[75] Inventors: Hiroshi Hasegawa, Tokyo; Kunihiro Nakano, Kawasaki, both of Japan

[73] Assignee: Nippon Kogaku K.K., Tokyo, Japan

[21] Appl. No.: 929,040

[22] Filed: Jul. 28, 1978

[30] Foreign Application Priority Data

Jul. 29, 1977 [JP] Japan .................... 52/101805[U]
May 8, 1978 [JP] Japan .................... 53-60787[U]

[51] Int. Cl.² .................... G03B 15/05; G03B 17/18
[52] U.S. Cl. .................................... 354/127; 354/289
[58] Field of Search ............... 354/53, 60 L, 60 E, 354/60 F, 127, 128, 289, 273; 362/5; 315/129–136; 340/660–663

[56] References Cited

U.S. PATENT DOCUMENTS

| | | | |
|---|---|---|---|
| 3,499,375 | 3/1970 | Kubayashi et al. | 354/127 X |
| 3,696,721 | 10/1972 | Wagner | 354/60 L X |
| 4,051,491 | 9/1977 | Toyoda | 354/60 L |
| 4,096,498 | 6/1978 | Okuno et al. | 354/127 |
| 4,122,465 | 10/1978 | Hasigawa et al. | 354/60 L X |

FOREIGN PATENT DOCUMENTS 491204 1/1974 Japan .

*Primary Examiner*—L. T. Hix
*Assistant Examiner*—William B. Perkey
*Attorney, Agent, or Firm*—Fitzpatrick, Cella, Harper & Scinto

[57] ABSTRACT

A warning circuit in an auto-controlled flashlight device comprises a first circuit for generating a voltage corresponding to the guide number determined by film sensitivity, aperture value and object distance, a second circuit for generating a maximum voltage corresponding to the maximum value of the quantity of light emitted by the auto-controlled speed light and a minimum voltage corresponding to the minimum value of the quantity of light emitted by the auto-controlled speed light, comparator means for comparing the output voltage of said first circuit with said maximum voltage and said minimum voltage and generating a high-level signal when the output voltage is in the range of said maximum voltage value and said minimum voltage value but generating a low-level signal when the output voltage is beyond the range, and a light emitting display element turned on in response to the high-level signal from the comparator means.

4 Claims, 3 Drawing Figures

WARNING CIRCUIT IN AN AUTO-CONTROLLED FLASHLIGHT PHOTOGRAPHING DEVICE

BACKGROUND OF THE INVENTION

1. Field of the Invention

This invention relates to a warning circuit in a flashlight device using an auto-controlled speed light and a camera.

2. Description of the Prior Art

The variation in the quantity of light emitted by the auto-controlled speed light has an upper and a lower limit. Therefore, depending chiefly on the selected aperture value and the selected distance to the object to be photographed, over or under exposure may occur. For this reason, a warning device has heretofore been proposed which displays, by means of a meter needle, the relation between the aperture value and the object distance exceeding the upper and the lower limit of the quantity of light emitted and the sensitivity of the film loaded in the camera, thereby calling attention to changing the aperture value and the object distance, thus preventing a failure in exposure.

However, in case of flashlight photography in the dark, the meter needle cannot be seen and this is inconvenient as the means of warning. Also, in order for the film sensitivity to be electrically introduced in the device, it is necessary to deviate the interlocking positional relation between a variable resistor interlocking with the aperture mechanism to introduce the aperture value in the device, and the aperture mechanism in accordance with the film sensitivity, and this makes the device more complex in construction.

It is an object of the present invention to provide a warning device in an auto-controlled speed light which displays by means of a light-emitting element such as a light-emitting diode whether the combination of the aperture value, the object distance and the film sensitivity is within the range of the upper and lower limits of the quantity of light emitted by the auto-controlled speed light.

There has heretofore been a device which introduces exposure information such as the aperture value of the photographic lens and the object distance from a camera or a lens into a speed light and displays in advance without resorting to light emission whether the light controlling operation of the speed light is properly effected in accordance with said information. The display effected by the display device when such a speed light is used in combination with a camera or a lens which does not generate the information such as the film sensitivity, the aperture value of the lens and the object distance has been coincident with the display of the fact that the light controlling operation is not properly effected, and this has been undesirable for the observation. That is, the observer cannot distinguish between these two displays.

SUMMARY OF THE INVENTION

It is therefore an object of the present invention to provide a display device which can distinguishably effect the display of the success or failure of light controlling operation when an auto-controlled speed light is used in combination with a camera and a lens which generate exposure information and the display when the speed light is combined with a camera and lens which do not generate the exposure information.

The invention will become more fully apparent from the following detailed description thereof taken in conjunction with the accompanying drawings.

DESCRIPTION OF THE PREFERRED EMBODIMENTS

Figure 1:
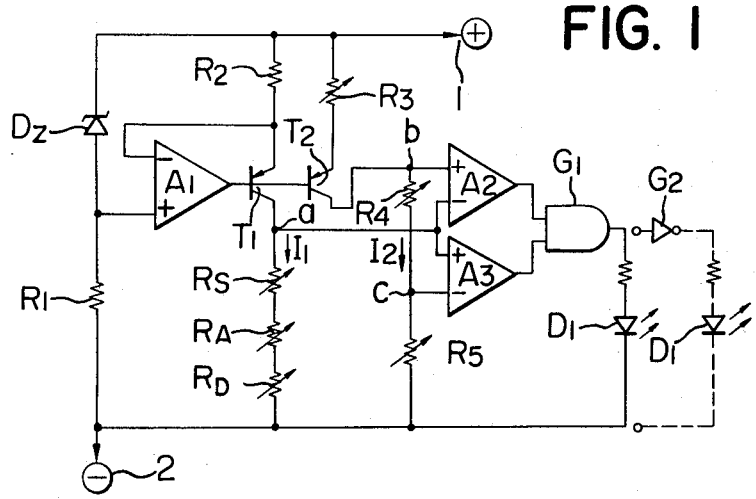
FIG. 1 is a circuit diagram showing a first embodiment of the present invention.

Reference is first had to FIG. 1 to describe a first embodiment of the present invention. In FIG. 1, a Zener diode $D_Z$ and a resistor $R_1$ are series-connected between the positive pole 1 and the negative pole 2 of a power source (not shown). Also series-connected between the positive pole 1 and the negative pole 2 of the power source are a resistor $R_2$, a variable resistor $R_S$ whose resistance value is variable in accordance with film sensitivity, a variable resistor $R_A$ whose resistance value is variable in accordance with the aperture value of the photographic lens, and a variable resistor $R_D$ whose resistance value is variable in accordance with the distance to the object to be photographed, with a transistor $T_1$ interposed between the resistors $R_2$ and $R_S$. Further series-connected between the positive pole 1 and the negative pole 2 are a resistor $R_3$, a first reference resistor $R_4$ and a second reference resistor $R_5$ with a transistor $T_2$ interposed between the resistors $R_3$ and $R_4$. An operational amplifier $A_1$ has its non-inversion input terminal connected to the junction between the Zener diode $D_Z$ and the resistor $R_1$, its inversion input terminal connected to the junction between the resistor $R_2$ and the emitter of the transistor $T_1$, and its output terminal connected to the bases of the transistors $T_1$ and $T_2$. The operational amplifier $A_1$, the Zener diode $D_Z$, the resistor $R_1$, $R_2$ and the transistor $T_1$ together constitute a first constant current source, and a constant current $I_1$ is put out from the collector of the transistor $T_1$. Thus, the constant current $I_1$ is supplied to the resistors $R_S$, $R_A$ and $R_D$, and a constant current $I_2$ is supplied to the resistors $R_4$ and $R_5$. For convenience, it is assumed that $I_1 = I_2$. A comparator $A_2$ has its inversion input terminal connected to the junction a, and its non-inversion input terminal connected to the junction b. A comparator $A_3$ has its non-inversion input terminal connected to the junction a and its inversion input terminal connected to the junction c. These comparators $A_2$ and $A_3$ act as window comparators. The outputs of the comparators $A_2$ and $A_3$ provide two inputs to an AND gate circuit $G_1$. A light-emitting diode $D_1$ is connected between the output terminal of the AND gate circuit $G_1$ and the negative pole ($-$).

Now, the guide number (hereinafter referred to as Gn) of the speed light is expressed as:

$$Gn = \sqrt{(Sx/Sa)} \, (A \cdot D) \qquad (1)$$

where Sx represents any given film sensitivity, Sa the standard film sensitivity (ASA 100), A the aperture value of the lens, D the distance to the object to be photographed.

The logarithms of the both sides of equation (1) are:

$$\ln Gn = \frac{1}{2}\ln Sx - \frac{1}{2}\ln Sa + \ln A + \ln D \qquad (2)$$

$$\ln Gn + \frac{1}{2}\ln Sa = \frac{1}{2}\ln Sx + \ln A + \ln D$$

Here, in order to introduce any given film sensitivity (usually, the sensitivity of the film loaded in the camera) from the variable resistor $R_S$, the resistance value of the resistor $R_S$ is made variable for the film sensitivity so as to satisfy the relation that $R_S \cdot I_1 = \frac{1}{2}\ln Sx$, i.e. $R_S = 1/2I_1 \ln Sx$. Likewise, the resistance value of the variable resistor $R_A$ is made variable for the aperture value so as to satisfy the relation that $R_A \cdot I_1 = \ln A$, i.e. $R_A = \ln A/I_1$.

Also, the resistance value of the variable resistor $R_D$ is made variable for the object distance so as to satisfy the relation that $R_D \cdot I_1 = \ln D$, i.e. $R_D = \ln D/I_1$. By doing so, $$(R_S + R_A + R_D) \cdot I_1 = \frac{1}{2}\ln Sx + \ln A + \ln D \qquad (3)$$

$$= \ln Gn + \frac{1}{2}\ln 100$$

Thus, a voltage corresponding to the guide number determined by the film sensitivity, the aperture value and the object distance is generated at the junction a.

On the other hand, the auto-controlled speed light has its quantity of light variable within a predetermined range and so, there are the lower limit value GN(min) and the upper limit value Gn(max) of it. Hence, the values of the resistors $R_4$ and $R_5$ are set so that $$R_5 \cdot I_2 = \frac{1}{2}\ln 100 + \ln GN(min) \qquad (4)$$

$$(R_5 + R_4) \cdot I_2 = \frac{1}{2}\ln 100 + \ln Gn(max) \qquad (5)$$

By doing so, a voltage corresponding to the upper limit value GN(max) of the guide number is generated at the junction b, and a voltage corresponding to the lower limit value Gn(min) of the guide number if generated at the junction c.

In the circuit controlled as described above, when the guide number Gn necessary for flashlight photography determined by the film sensitivity, the aperture value and the object distance is greater than the upper limit guide number Gn(max) of the speed light, the voltage generated at the junction a is higher than the voltage generated at the junction b or c. Therefore, the comparator $A_2$ generates a low-level signal (hereinafter referred to as L-signal) at its output terminal, and the comparator $A_3$ generates a high-level signal (hereinafter referred to a H-signal) at its output terminal. In response thereto, the AND gate circuit $G_1$ generates L-signal, so that the light-emitting diode $D_1$ becomes turned off. Also, if the guide number Gn necessary for flashlight photography is smaller than the lower limit guide number Gn(min) of the speed light, the voltage at the junction a is lower than the voltage at the junction b or c. Therefore, the comparator $A_2$ generates H-signal at its output terminal and the comparator $A_3$ generates L-signal at its output terminal. In response thereto, the AND gate circuit $G_1$ puts out L-signal, so that the light emitting diode $D_1$ becomes turned off. If the guide number Gn necessary for flashlight photography is between the upper limit Gn(max) and the lower limit Gn(min) of the guide number of the speed light, then the voltage at the junction a is lower than the voltage at the junction b but higher than the voltage at the junction c. Therefore, the comparators $A_2$ and $A_3$ both put out H-signals, so that the AND gate circuit $G_1$ puts out H-signal, thus turning on the light-emitting diode $D_1$.

As will be seen from the foregoing description, the light-emitting diode $D_1$ is turned off when the quantity of emitted light necessary for flashlight photography goes beyond the light control range to cause excess and deficient exposure, and is turned on when the quantity of emitted light is proper, so that the photographer can change the aperture value, the object distance and the film sensitivity within the range for which the light-emitting diode $D_1$ is turned on, whereby accomplishing proper exposure. The turn-on and turn-off of the light-emitting diode $D_L$ may be the reverse of the described relation and in that case, an inverter $G_2$ may be connected between the light-emitting diode $D_1$ and the AND gate circuit $G_1$, as shown at the right-hand side of FIG. 1.

Figure 2:
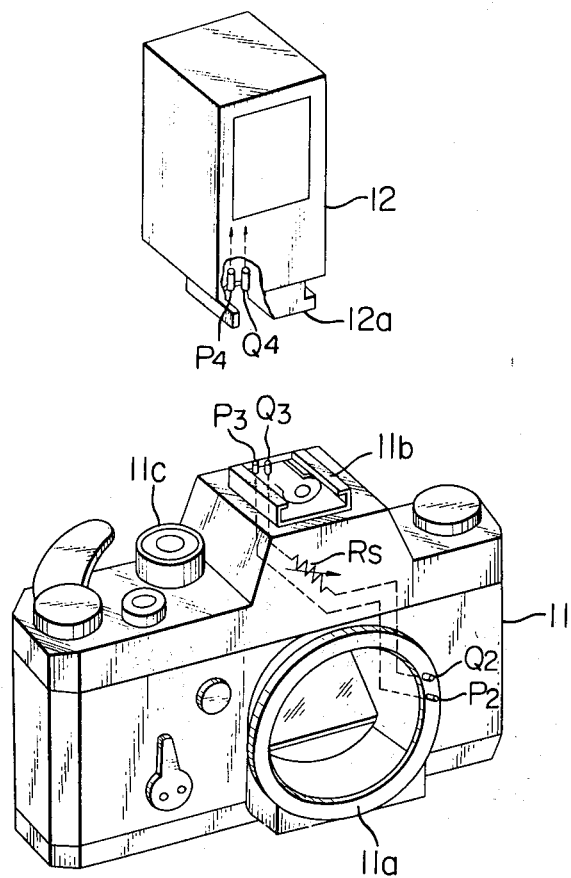
FIG. 2 illustrates the flashlight device and the relations between variable resistors $R_S$, $R_D$ and $R_A$ in FIG. 1.

FIG. 2 is a perspective view of a flashlight photography device. Designated by 10 is a lens, 11 a camera, and 12 an auto-controlled speed light. The lens 10 is provided with two connector pins $P_1$ and $Q_1$, between which variable resistors $R_A$ and $R_D$ are series-connected. The variable resistor $R_A$ has its resistance value variable in response to the aperture ring 10a of the lens, as already described, and the variable resistor $R_D$ has its resistance value variable in response to the distance ring 10b of the lens, also as already described. The body mount 11a of the camera 11, on which the lens 10 is mounted, is provided with connector pins $P_2$ and $Q_2$ for connection to the connector pins $P_1$ and $Q_1$, respectively, of the lens 10. An accessory shoe 11b is provided with connector pins $P_3$ and $Q_3$. The variable resistor $R_S$ is connected between the connector pins $Q_2$ and $Q_3$ and the resistance value thereof is variable in response to a film sensitivity setting dial 11c, as already noted.

The connector pins $P_2$ and $P_3$ are in their conductive state. The mount shoe 12 of the speed light 12 is provided with connector pins $P_4$ and $Q_4$ and, by mounting the mount shoe 12 to the accessory shoe 11b, the connector pins $P_4$ and $Q_4$ are connected to the connector pins $P_3$ and $Q_3$, respectively. The speed light 12 contains therein all elements of the circuit shown in FIG. 1 except the above-described variable resistors $R_A$, $R_D$ and $R_S$.

Thus, when the lens 10 and the speed light 12 are mounted on the camera 11, all of the aperture value, the object distance and the film sensitivity are introduced in the warning circuit by moving the aperture ring 11a, the distance ring 11b and the film sensitivity setting dial 11c. Also, when the film sensitivity is introduced, the positional relation between the variable resistor interlocking with the above-described aperture mechanism and the interlocking mechanism need not be varied in accordance with the film sensitivity. Therefore, in the lens 10, the aperture value and the object distance can be individually introduced, and in the camera 11, the film sensitivity can be introduced individually, thus simplifying the interlocking relation between the variable resistors $R_A$, $R_D$ and $R_S$ and their corresponding aperture mechanism and the focal length adjusting mechanism and the film sensitivity setting mechanism (not shown).

As the reference resistors $R_4$ and $R_5$, resistors corresponding to the upper and lower limits of the guide number of the speed light may be contained in the respective speed lights to eliminate the need for cumbersome adjustment of the reference resistors $R_4$ and $R_5$ even if speed lights differing in upper and lower limit of guide number are used.

The light emitting diode $D_1$ may also be disposed within the viewfinder of the camera 11.

Figure 3:
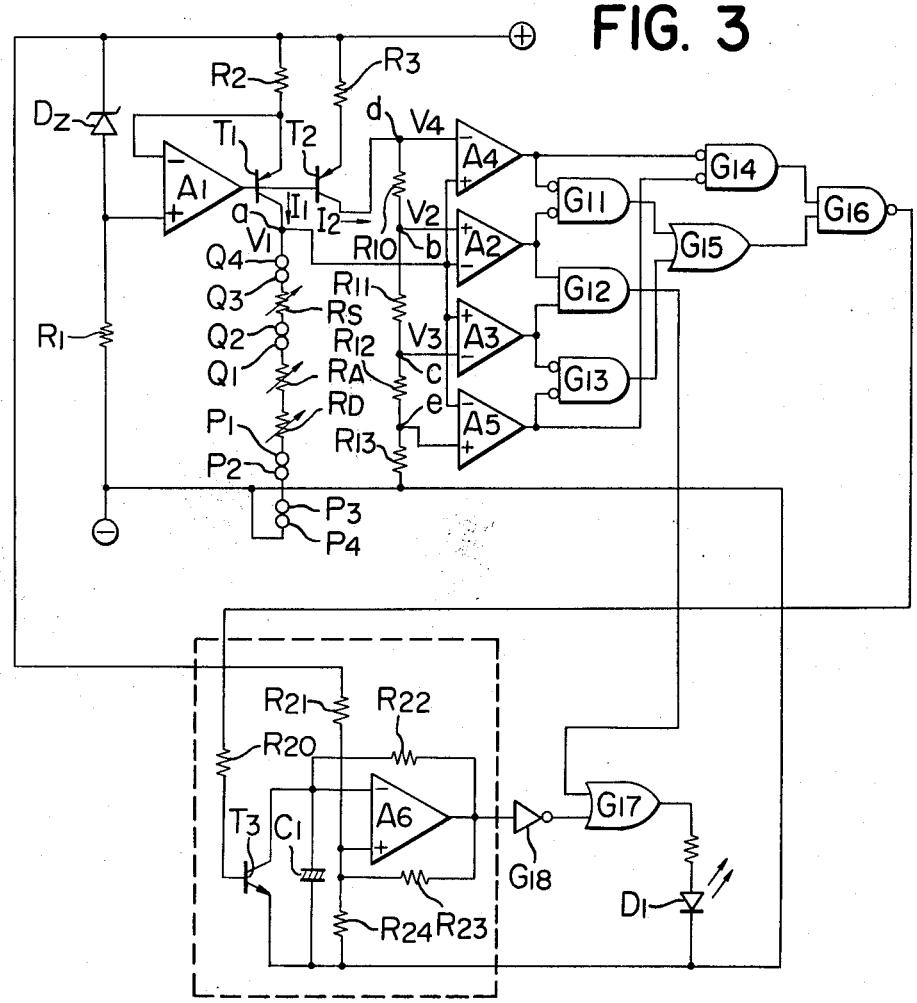
FIG. 3 is a circuit diagram showing a second embodiment of the present invention.

Reference is now had to FIG. 3 to describe a second embodiment of the present invention. In FIG. 3, $R_{10}$–$R_{13}$ are serial resistors receiving the current supply from transistor $T_2$ and $A_2$–$A_5$ are corresponding comparators. Comparators $A_2$, $A_3$ and comparators $A_4$, $A_5$ respectively act as window comparators.

Values of resistors $R_{10}$ and $R_{13}$ are set such that the voltage $V_2$ at the junction b and the voltage $V_3$ at the junction c correspond to Gn(max) and Gn(min), respectively, as already described, and that the voltage $V_4$ at the junction d and the voltage $V_5$ at the junction e respectively correspond to the maximum guide number Gnomax determined by the combination of variable resistors $R_A$, $R_D$ and $R_S$ and the minimum guide number Gnomin.

Here, Gnomax and Gnomin will be considered. Originally, the auto-controlled speed light has its specific Gnmax and Gnmin as already described. By the way, the guide number is determined by the combination of the aperture value, the object distance and the film sensitivity as shown by equation (1) and therefore, depending on the combination of the set aperture value, the set object distance and the set film sensitivity, thereby may exist a guide number which exceeds the range of Gnmax and Gnmin. On the other hand, the ranges of the exposure factors such as the aperture value, etc. which are actually set in the camera or the lens are limited. For example, the sensitivity of the commercially available film is of the order of ASA 25 to 400, and the object distance is usually 10 m.

Therefore, Gnomax and Gnomin are used on the values which these exposure factors can actually assume and correspond to the maximum and the minimum value determined by the combination of those factors.

Comparators $A_2$ and $A_3$ detect, as previously described, whether the exposure factors are combined within the range of Gnomax and Gnomin. Comparators $A_4$ and $A_5$ not only detect whether the exposure factors are combined within the range of Gnomax and Gnomin but also detect when the combination of the speed light with the camera or the lens is wrong by the fact that the potential of the connector Pin $Q_4$ is open or short-circuit voltage.

An operational amplifier $A_6$, transistor $T_3$, capacitor $C_1$ and resistors $R_{20}$–$R_{24}$ together constitute an oscillation circuit which starts oscillation upon turn-on of the transistor $T_3$ and stops oscillation upon turn-off of the transistor $T_3$. The output of the operational amplifier $A_6$ during the stoppage of the oscillation is fixed to H. Gates $G_{11}$–$G_{18}$ effects logic processing for controlling the light-emitting diode $D_1$.

The operation takes place as shown in the table below.

exposure information is displayed by turn-on of the light-emitting diode, and the case where the light controlling operation is not possible is displayed by flickering of the light-emitting diode $D_1$. Also, the display when the light controlling operation is combined with the camera or the lens which does not generate any exposure information is effected by the turn-off of the light-emitting diode $D_1$.

We claim:

1. A warning circuit in an auto-controlled flashlight device comprising:
    (i) a first circuit including a first variable resistor ($R_D$) whose resistance value is variable in accordance with the logarithm of the object distance, a second variable resistor ($R_A$) whose resistance is variable in accordance with the logarithm of the aperture value and a third variable resistor ($R_S$) whose resistance value is variable in accordance with the logarithm of the film sensitivity, the first, second and third resistors being connected in series;
    (ii) a constant current source ($A_1$, $D_Z$, $R_1$, $R_2$, $T_1$) for generating a constant current;
    (iii) a junction (a) between said first circuit and said constant current source, at which junction is generated an output voltage corresponding to a guide number determined in accordance with the object distance, aperture value and film sensitivity, when a current from the constant current source flows through said first circuit;
    (iv) a second circuit ($R_1$, $D_Z$, $A_1$, $R_3$, $T_2$, $R_4$, $R_5$) for generating a maximum voltage corresponding to the maximum value of the quantity of light emitted by the auto-controlled speed light and a minimum voltage corresponding to the minimum value of the quantity of light emitted by the auto-controlled speed light;
    (v) Comparator means for comparing the output voltage of said first circuit with said maximum voltage and said minimum voltage and generating a first signal when said output voltage is in the range of said maximum voltage and said minimum voltage value but generating a second signal when said output voltage is beyond said range; and
    (vi) a light emitting display element turned on in response to the first signal from said comparator means.

2. A warning circuit as defined in claim 1, wherein said second circuit comprises two voltage dividing resistors ($R_4$, $R_5$) series-connected together so as to provide said maximum voltage and said minimum voltage, and a constant current source ($A_1$, $D_Z$, $R_1$, $R_3$, $Q_2$) for supplying a constant current to said voltage dividing resistors.

3. A warning circuit as defined in claim 1, further comprising:
    a third circuit ($R_{13}$, $R_{10}$) for generating a maximum voltage corresponding to the maximum value of

TABLE

| $V_1$ | $A_4$ | $A_2$ | $A_3$ | $A_5$ | $G_{11}$ | $G_{12}$ | $G_{13}$ | $G_{14}$ | $G_{15}$ | $G_{16}$ | $A_6$ | $G_{18}$ | $G_{17}$ | $D_1$ |
|---|---|---|---|---|---|---|---|---|---|---|---|---|---|---|
| $V_1 < V_5$ | L | H | L | H | L | L | L | L | L | H | H | L | L | OFF |
| $V_5 < V_1 < V_3$ | L | H | L | L | L | L | H | H | H | L | H↔L | L↔H | L↔H | FLICKER |
| $V_3 < V_1 < V_2$ | L | H | H | L | L | H | L | H | L | H | L | H | H | ON |
| $V_2 < V_1 < V_4$ | L | L | H | L | H | L | L | H | H | L | H↔L | L↔H | L↔H | FLICKER |
| $V_4 < V_1$ | H | L | H | L | L | L | L | L | L | H | H | L | L | OFF |

From the table above, it will be seen that the case where the light controlling operation is possible when combined with the camera or the lens which generates the guide number determined by the combination of film sensitivity, aperture value and object distance and a minimum voltage corresponding to the minimum value of said guide number; and means for detecting when the output voltage of said first circuit is in the range of the maximum voltage and the minimum voltage of said third circuit and causing said light-emitting diode to flicker.

4. A warning circuit as defined in any of claims 1 or 2, wherein said comparator means comprises two comparators ($A_2$, $A_3$) acting as window comparators which generate signals at the same time only when the output voltage of said first circuit is in the range of said maximum voltage value and said minimum voltage value, and an AND gate circuit ($G_1$) for applying a signal to said light-emitting element in response to the signals from said comparators.

* * * * *